E. H. FORD.
METER ATTACHMENT FOR METER BOX MOUNTING.
APPLICATION FILED OCT. 21, 1915.
1,191,503.
Patented July 18, 1916.
2 SHEETS—SHEET 1.
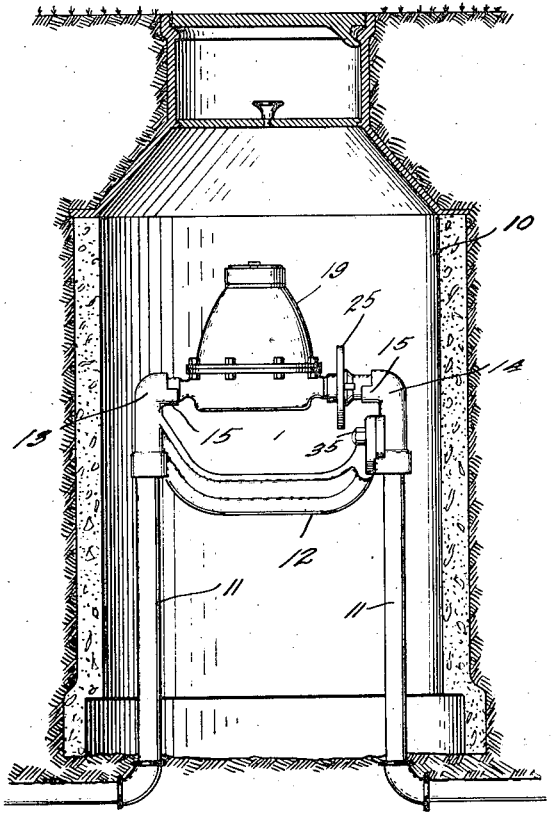
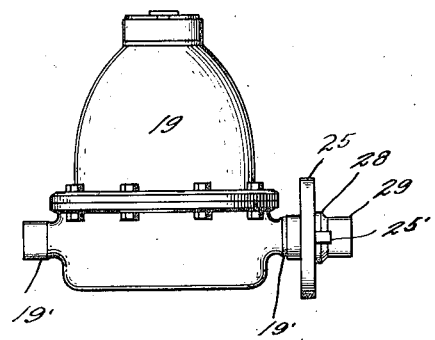
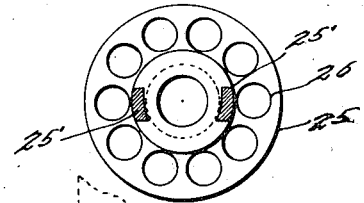
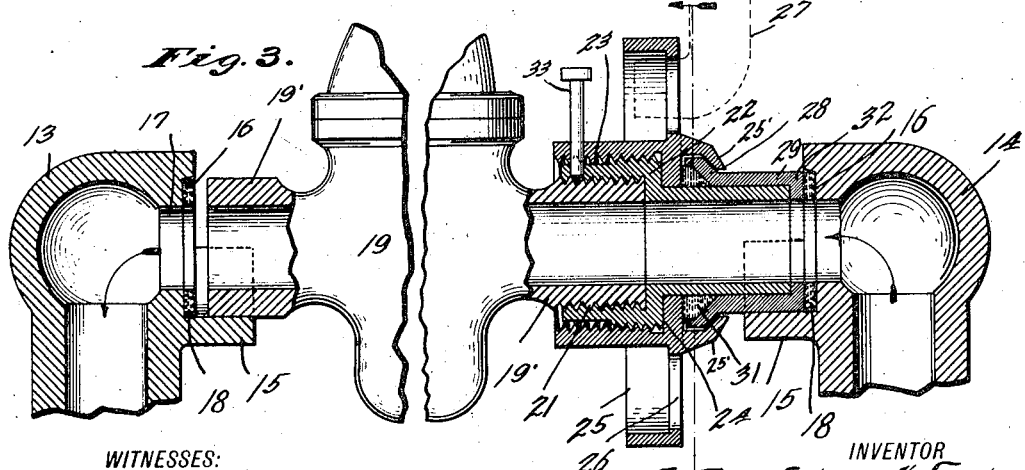
WITNESSES:
INVENTOR
Edwin H. Ford,
BY
ATTORNEYS

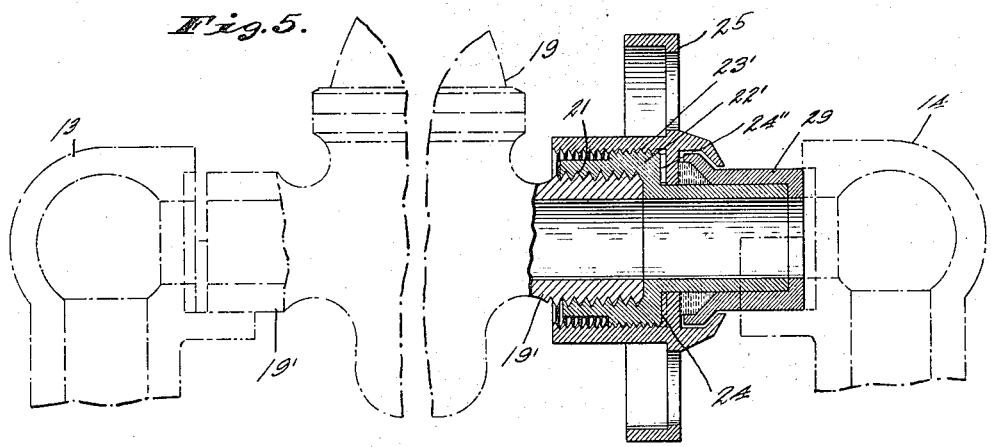
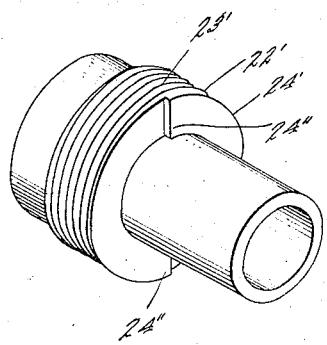
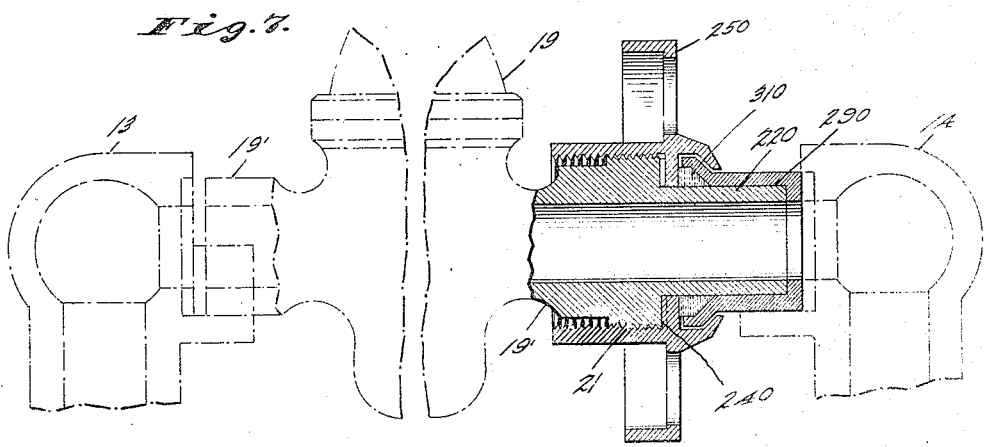

UNITED STATES PATENT OFFICE.

EDWIN H. FORD, OF WABASH, INDIANA.

METER ATTACHMENT FOR METER-BOX MOUNTING.

1,191,503.  Specification of Letters Patent.  Patented July 18, 1916.

Application filed October 21, 1915. Serial No. 57,054.

*To all whom it may concern:*

Be it known that I, EDWIN H. FORD, a citizen of the United States, residing at Wabash, in the county of Wabash and State of Indiana, have invented a new and useful Meter-Attachment for Meter-Box Mounting, of which the following is a specification.

It is the common practice to mount water meters in suitable boxes or pits formed in the ground outside of the premises to be supplied, the meter being associated with a yoke connected to the service mains and equipped with a device by means of which extension of the members longitudinally of the meter connections, will serve to bind the meter into place. In such devices, however, the extensible means has been associated with the yoke and the production of the device, as well as its mounting, has involved some expense and inconveniences in handling.

The object of my present invention is to produce a fitting or attachment which may be readily connected to any standard meter by merely providing one of the meter nipples with suitable threads. By such an arrangement, it becomes possible to simplify the construction of the yoke so as to avoid the necessity of any machining of those parts which are designed to receive the meter.

The accompanying drawings illustrate my invention.

Figure 1 is a vertical section of a standard meter box and meter, equipped with my improvement, mounted therein; Fig. 2 a side elevation of a common form of meter equipped with my attachment; Fig. 3 a sectional detail of my attachment, fragments of a meter, and adjacent parts of the receiving yoke; Fig. 4 a section on line 4—4 of Fig. 3; Fig. 5 an axial section of a modified form; Fig. 6 a perspective of the attachment-sleeve of the form shown in Fig. 5, and Fig. 7 an axial section of a third modification.

In the drawings, 10 indicates any suitable pit or box construction in which the meter is to be mounted. Service pipes 11 lead to and from the box 10 and are associated at their upper ends with a yoke 12 carrying a pair of tubular members 13 and 14 which receive the service 11. Each of the members 13 and 14 is provided with a semi-circular, upwardly-presented flange 15 which flanks a circular socket 16 in the bottom of which is a passage 17 leading to the interior of the member, as clearly shown in Fig. 3. Heretofore it has been necessary to machine these flanges and sockets but with my improved construction, I find it possible to form these parts by an ordinary chilled casting. Each socket 16 is comparatively shallow and receives a compressible washer 18 which practically fills the socket. The standard form of meter 19 provides a pair of oppositely extending nipples 19' which have a diameter equal to the interior diameter of the semi-circular flange 15 and for use with my improved attachment, I provide one of these nipples 19' with external threads 21 adapted to receive a main sleeve 22 which is internally threaded to receive the threads 21 and is externally threaded at 23, the external threads 23 being opposite in pitch to the threads receiving threads 21. Sleeve 22 is provided at an intermediate point in its length with a shoulder 24. Sleeved over the sleeve 22 and threaded upon threads 23 is an operating member 25 which conveniently takes the form of a disk or wheel having a portion adapted to engage the shoulder 24 in one direction after having been threaded upon the threads 23. This member 25 is conveniently provided with a series of perforations 26 by means of which it may be engaged, as by means of a hook 27, and rotated. Upon the face opposite that which engages the shoulder 24, the disk 25 is provided with a pair of hooked fingers 25' adapted to embrace the flaring flange 28 of a sleeve 29 which is sleeved upon the smaller portion of sleeve 22 and arranged between this flaring flange 28 and the disk 25 is a packing gasket 31. Sleeve 29 at its end is provided with an inturned flange 32 which overlies the end of a smaller portion of sleeve 22 and in external diameter the main body of sleeve 29 is substantially that of the external diameter of one of the nipples 19' of meter 19 so that sleeve 29 may properly rest and fit in either one of the semi-circular flanges 15 of the yoke connection.

In use my improved fitting will be assembled in a manner shown in Fig. 3 and the disk 25 locked to sleeve 22 by means of a pin 33 passed through suitable holes formed in the two members, as shown in Fig. 3. Thereupon, the fitting will be screwed upon threads 21 by applying suitable turning force to the disk 25. Thereupon the meter with its attachment may be very easily lowered into position in the box 10 and the unthreaded nipple 19' and the sleeve 29 resting in the two semi-circular flanges 15 and the total length between the outer end of sleeve 29 and the opposite nipple 19' being somewhat less than the distance between the two washers 16 so that the insertion may be easily accomplished. Thereupon, pin 33 having been previously withdrawn, the disk 25 is rotated upon sleeve 22 in a direction opposite to that rotation which screwed sleeve 22 upon nipple 19'. This motion drives the disk toward the adjacent yoke fitting 14, thus shifting the sleeve 29 longitudinally on sleeve 22 and not only bringing the end of the sleeve 29 into tight engagement with the adjacent washer 16, but also operating to shove the meter laterally to bring its opposite nipple 19' into tight engagement with the adjacent washer 16, and also to drive the packing gasket 31 tightly into the crotch between the flange 28 of sleeve 29 and the smaller unthreaded portion of sleeve 22, thus firmly clamping the meter in place and making fluid-tight joints with the service connections.

In view of the fact that the joints between the meter and service connections are, in the present construction, merely butt joints, it is apparent that no machining of the service connections 13 and 14 is necessary and consequently they may be made integral with the yoke 12, if desired, although in practice, I consider it best to make one of the members, as, for instance, the member 14, in a separate piece bolted to the yoke 12 by suitable bolts 35. All of the fitting parts of my improved attachment are circular so that they may be readily formed in a lathe at comparatively small expense.

Under some conditions, the right and left hand threads 21 and 23 might prove objectionable, because, after the meter has been long in place, turning force applied to the member 25 might result in loosening the member 22 upon threads 21, in which case the structure would be tightened in place instead of being loosened. In order to overcome this difficulty, the form shown in Figs. 5 and 6 has proven satisfactory. In this construction, the sleeve 22' is internally threaded to receive the threads 21 of nipple 19'. The shoulder 24', however, is in the form of two similarly placed cam surfaces forming radial shoulders 24''. The pitch of these cam surfaces corresponds to the pitch of the external threads 23' and these threads may have a pitch somewhat finer than that of threads 21, but in the same direction. Otherwise, the parts are the same as shown in Fig. 3, except that the pin 33 is not needed. In this construction, member 25 is screwed upon threads 23' until shoulders 24'' are engaged, the member 25 having mating portions, whereupon the member 25 and sleeve 22 will move together as the member 22 is threaded upon threads 21. Thereupon, member 25 may be backed off in order to project sleeve 29 in the manner already described.

In the form shown in Fig. 7, I have shown the sleeve 220 as integral with the meter casing, being provided with shoulders 240 like the shoulders 24', illustrated in Figs. 5 and 6. The members 250, 310 and 290 correspond to the members 25, 31 and 29 of the forms shown in Figs. 3 and 5, the member 250 being provided with cam portions to correspond to the cam shoulders 240.

I claim as my invention:

1. The combination with a meter, of a fitting attached to one of its nipples, said fitting comprising an attaching member, a joint forming member longitudinally movable relative to the attaching member, and an intermediate rotary member arranged between the first two members and relatively rotatable thereon to produce relative longitudinal shifting of the first two members whereby the meter may be tightly positioned between opposed service members.

2. A fitting for meters, comprising a main sleeve provided with a thread for attachment to a meter nipple and also provided with an oppositely pitched thread, a second sleeve sleeved upon the first and axially movable thereon, a rotatable member threaded upon the oppositely pitched thread of the main sleeve and carrying a pair of hooked fingers embracing the second sleeve, and a packing gasket arranged around the main sleeve between the second sleeve and the said rotatable member, substantially as and for the purpose set forth.

3. A fitting for meters, comprising a main sleeve provided with a thread for attachment to a meter nipple and also provided with an oppositely pitched thread, a second sleeve sleeved upon the first and axially movable thereon, a rotatable member threaded upon the said oppositely pitched thread of the first-mentioned sleeve, and a packing gasket arranged around the first sleeve between the second sleeve and the rotatable member, substantially as and for the purpose set forth.

4. The combination with a meter having induction and eduction openings, of a joint-forming member associated with one of said openings and carried by the meter body, and a member also carried by the meter body and engaging the joint-forming member to shift the same axially of the opening with which it is associated whereby the normal distance between the joint-forming portion of said joint-forming member and the opening other than the one with which it is associated may be varied and the meter thus established with relation to its service connections.

5. A fitting for meters, comprising a main sleeve provided with threads for attachment to a meter nipple and also provided with threads to receive an actuating member, the said actuating member mounted upon said threads, a second sleeve sleeved upon the first sleeve and axially movable thereon, and connections between said second sleeve and the actuating member whereby the second sleeve may be axially shifted upon the first sleeve.

6. The combination with a meter having induction and eduction passages, a joint-forming sleeve associated with one of said passages and axially shiftable, an actuating member mounted upon the meter adjacent said joint-forming sleeve and engaging the same, the connection between the actuating member, the meter body, and the joint-forming sleeve being such that movement of the actuating member will operate to shift the joint-forming sleeve axially.

7. A fitting for meters, comprising a main sleeve provided with threads for attachment to a meter nipple and also provided with a set of threads having the same direction of pitch, an actuating member threaded upon said second set of threads, mating radial shoulders between the actuating member and main sleeve limiting rotation of the actuating member in one direction, and a second sleeve sleeved upon the first sleeve and engaged by the actuating member so as to be axially shifted thereby.

In witness whereof, I have hereunto set my hand at Indianapolis, Indiana, this 14th day of October, A. D. one thousand nine hundred and fifteen.

EDWIN H. FORD.